(12) United States Patent
Lvovskiy et al.

(10) Patent No.: US 8,982,472 B2
(45) Date of Patent: Mar. 17, 2015

(54) METHOD OF WIDENING OF ANGULAR FIELD OF VIEW OF COLLIMATING OPTICAL SYSTEMS

(71) Applicants: Matvey Lvovskiy, Brooklyn, NY (US); Alexsander Efros, Sanct-Petersburg (RU)

(72) Inventors: Matvey Lvovskiy, Brooklyn, NY (US); Alexsander Efros, Sanct-Petersburg (RU)

( * ) Notice: Subject to any disclaimer, the term of this patent is extended or adjusted under 35 U.S.C. 154(b) by 0 days.

(21) Appl. No.: 13/898,591

(22) Filed: May 21, 2013

(65) Prior Publication Data
US 2014/0347737 A1 Nov. 27, 2014

(51) Int. Cl.
*G02B 27/01* (2006.01)
*G02B 27/30* (2006.01)

(52) U.S. Cl.
CPC .............. *G02B 27/30* (2013.01); *G02B 27/01* (2013.01); *G02B 27/0172* (2013.01)
USPC .............. 359/641; 359/630; 359/632; 345/7; 345/8

(58) Field of Classification Search
CPC ........ G02B 13/06; G02B 13/16; G02B 13/18; G02B 27/144; G02B 27/0172; G02B 27/1013; G02B 27/126; G02B 27/30; G02B 3/00; G02B 21/02; G02B 21/084; G02B 17/086; G02B 17/08; G02B 17/0808; G02B 25/02
USPC ................. 359/641, 648–351, 662, 663, 708, 359/724–732, 744, 798–801, 632
See application file for complete search history.

(56) References Cited

U.S. PATENT DOCUMENTS

| | | | |
|---|---|---|---|
| 3,940,204 A | 2/1976 | Withrington | |
| 4,407,564 A | 10/1983 | Ellis | |
| 4,652,870 A | 3/1987 | Steward | |
| 4,832,449 A | 5/1989 | Mundy et al. | |
| 5,278,696 A | 1/1994 | Savada | |
| 5,486,953 A * | 1/1996 | Shu | 359/725 |
| 5,497,271 A | 3/1996 | Mulvanny et al. | |
| 5,640,275 A | 6/1997 | Bourguignat et al. | |
| 6,028,719 A * | 2/2000 | Beckstead et al. | 359/725 |
| 6,075,651 A | 6/2000 | Hoppe | |
| 6,262,848 B1 | 7/2001 | Anderson et al. | |
| 6,333,826 B1 * | 12/2001 | Charles | 359/725 |
| 6,392,812 B1 | 5/2002 | Howard | |
| 6,486,856 B1 | 11/2002 | Zink | |
| 6,567,014 B1 | 5/2003 | Hansen et al. | |
| 6,791,511 B2 | 9/2004 | Eschler | |
| 6,809,887 B1 * | 10/2004 | Gao et al. | 359/725 |
| 6,992,578 B2 | 1/2006 | Aoki et al. | |
| 7,391,574 B2 | 6/2008 | Fredriksson | |
| 7,446,733 B1 * | 11/2008 | Hirimai | 345/32 |

(Continued)

*Primary Examiner* — Suchin Parihar
*Assistant Examiner* — William R Alexander (57) ABSTRACT

Method of horizontal widening of angular field of view of collimating optical system using several unified ax symmetric collimating optical systems spaced out horizontally with angular fields of view of rectangular shape with their boundaries oriented horizontally and vertically and their axes are turned horizontally relative to each other so that adjacent vertical boundaries of angular fields of view of neighboring systems coincide and full angular field of view of collimating optical system is sum of angular fields of view of unified optical systems included in it and to display total virtual information collimating optical system is conjugated with two-component combiner and primary image creators e.g. LCDs are located in focal planes of unified optical systems and wide-angle panoramic collimating optical system with horizontal field of view up to 360° can be build also.

6 Claims, 6 Drawing Sheets

(56) References Cited

U.S. PATENT DOCUMENTS

| | | |
|---|---|---|
| 7,482,996 B2 | 1/2009 | Larson et al. |
| 2004/0066449 A1* | 4/2004 | Givon .............................. 348/48 |
| 2010/0302348 A1* | 12/2010 | Richards ......................... 348/36 |
| 2012/0284668 A1* | 11/2012 | Bamford et al. ............... 715/834 |
| 2012/0284671 A1* | 11/2012 | Bamford et al. ............... 715/850 |
| 2013/0050835 A1* | 2/2013 | Inoguchi et al. ............... 359/630 |
| 2013/0114147 A1* | 5/2013 | Stark .............................. 359/664 |

* cited by examiner

METHOD OF WIDENING OF ANGULAR FIELD OF VIEW OF COLLIMATING OPTICAL SYSTEMS

BACKGROUND OF THE INVENTION

Suggested method of widening of angular field of view of collimating optical systems used in equipment of various type differs from known methods. The best known and widely applied methods of design of such optical systems are stated below.

Routine method is based on application of ax symmetric collimating optical systems with spherical optical elements and widening of angular field of view accessible for perception by operator is attained by increase of aperture of optical system at the expense of appropriate increase of size (diameters) of optical elements (lenses, mirrors, prisms, etc.). Usually the size of optical system is not crucial if it is used under steady-state conditions. There are challenges (irresistible in some cases) if large-dimension optical elements and systems are used under the restricted space conditions such as aircraft, piloted spaceship or specific surface transportation. Therefore following analysis of various methods of building of collimating optical systems concerns collimating optical systems intended for application in collimating displays installed in the aircrafts.

The displays by patents U.S. Pat. No. 6,392,812 and U.S. Pat. No. 7,391,574 could be used as aircraft displays in which collimating optical systems constructed according to given method have been applied. It follows from analysis of mentioned patents that they lack purpose and accordingly distinctive features of increase of angular field of view of collimating optical systems of displays by use of the method which could differ from the method in question. For absolute majority of collimating displays installed in modern aircrafts and designed according to this procedure the diameter of exit lenses of optical system does not exceed 150-180 mm and size of full field of view does not exceed 25. Further increase of diameter of the exit lens is undesirable since it causes increase of size and weight of display that could affect flight safety.

Another method is based on application of decent red (off-axis) non planar reflecting elements including holographic optical elements (HOE) in collimating optical systems. The main purpose of this method application is widening of angular field of view of optical system, mainly horizontally.

U.S. Pat. No. 3,940,204, U.S. Pat. No. 4,407,564, U.S. Pat. No. 5,640,275 could be cited as theoretical examples of architecture of collimating optical systems based on HOE and intended for application in aircraft collimating displays in which the size of angular field of view of collimating optical system can be increased horizontally up to 30.

In such collimating optical systems single or several HOE installed at the exit of optical system and at the same time in front of the pilot are most sophisticated and bulky optical components. Usually HOE is a non planar decent red substrate of glass with sophisticated multi-layer (or volume) hologram deposited on it providing high transparency within visual spectral range (up to 80%) and effective reflection (up to 70-80%) for the rays with fixed (operating) wave-length (usually green color) coinciding with spectral maximum of radiation of the image creator (e.g., CRT or LCD). In order to make such HOE complicated manufacturing technology is required that have to meet conditions of high vibration resistance and seismic stability and it is labor-intensive and costly and accessible only for advanced manufacturers.

It should be noted that generation and representation of only monochromatic image is implied in all known collimating displays based on HOE that causes restriction of display capabilities. It is practically impossible to use image creators based on color LCD, e.g., and accordingly to represent color information picture.

All above-stated confirms the urgency of development of alternative method of collimating optical system construction providing capability of widening of angular field of view of optical system horizontally up to parameters that are equal or exceeded to those parameters that have been attained when using HOE. At the same time manufacturing of collimating optical systems developed by use of alternative method must not be complicated and costly.

SUMMARY OF THE INVENTION

The method is suggested according to that widening of angular field of view of collimating optical system horizontally is attained by use of several unified ax symmetric collimating optical systems (further indicated as unified optical systems) spaced out horizontally with angular fields of view of rectangular shape the boundaries of that are oriented horizontally and vertically. At the same time vertical symmetry planes of unified optical systems are turned horizontally at specified angles in such way that adjacent vertical boundaries of angular fields of view of neighboring systems are superposed and full angular field of view of collimating optical system is equal to the sum of angular fields of view of unified optical systems included in it.

According to suggested method when using in collimating optical system two unified optical systems with equal angular fields of view of rectangular shape the boundaries of that are oriented horizontally and vertically the vertical symmetry planes of left and right unified optical systems have to be turned horizontally to the left and to the right, respectively, relative to vertical symmetry plane of collimating optical system at an angle equal to half of horizontal size of angular field of view of single unified optical system.

According to the suggested method when using three unified optical systems with equal fields of view of rectangular shape the boundaries of that are oriented horizontally and vertically the vertical symmetry plane of the middle unified optical system has to coincide with vertical symmetry plane of collimating optical system and vertical symmetry planes of left and right unified optical systems are turned horizontally to the left and to the right, respectively, relative to the mentioned vertical symmetry plane at an angle equal to horizontal size of angular field of view of the single unified optical system.

According to the suggested method when constructing wide-angle collimating optical system by use of application of several unified optical systems that are spaced out horizontally in order to provide uninterrupted perception of total collimated images created by summation of the images formed within angular field of view of each unified optical system against the outer space background single optical combiner is used that is located perpendicularly to the vertical symmetry plane of collimating optical system. Particularly, the combiner could be two-component with two mutually parallel semitransparent reflectors (components) located perpendicularly to vertical symmetry plane of collimating optical system.

To increase the instantaneous field of view and provide uniformity of collimated image brightness within full angular field of view the components of the combiner tilted at an angle about 45 are spaced out in height between each other at a fixed distance and at the same time:

lower component is located closer to the operator than the upper one;

upper component is carried out approximately two times shorter than the lower one and light-dividing coating is deposited on its whole area;

light-dividing coating is not deposited on the upper part of the lower component that is approximately equal to the upper component area;

reflection coefficients of the upper ($\rho_U$) and the lower ($\rho_L$) components of the combiner follow the formula:

$$\rho_U - \rho_L = \rho_U \rho_L$$

When using two-component combiner in order to prevent perception of secondary image of outward objects while observing through the upper component of the combiner numerical values of reflection coefficients of upper and lower components of the combiner have to be selected taking into account that brightness of secondary image has to be decreased up to threshold value under that the secondary image practically does not affect operation of collimating optical system.

In order to use widened information field effectively and improve image quality within field of view of collimating optical system, e.g., in collimating display, each of unified optical systems is conjugated with primary image creator, e.g., based on LCD, installed in its focal plane.

The suggested method makes it possible to construct panoramic collimating optical system with super wide-angle horizontal angular field of view and for that it is necessary to use several optical modules spaced out horizontally each of that contains several unified optical systems and two-component combiner. Vertical symmetry planes of mentioned optical modules have to be turned horizontally relative to each other so that adjacent vertical boundaries of angular fields of view of neighboring modules are superposed and full angular field of view of panoramic collimating optical system is equal to the sum of angular fields of view of optical modules included in it. In principle such panoramic collimating optical system can have any number of modules and corresponding increase of total angular field of view of the system up to full all-round viewing horizontally, i.e. 360°, can be provided.

DETAILED DESCRIPTION OF PREFERRED EMBODIMENT OF THE INVENTION

By the method suggested the collimating optical system contains several unified optical systems spaced out horizontally with angular fields of view of rectangular shape boundaries of that are oriented horizontally and vertically. Vertical symmetry planes of unified optical systems are turned horizontally in such way that adjacent vertical boundaries of neighboring systems are superposed and full angular field of view of collimating optical system is equal to the sum of angular fields of view of unified optical systems included in the system.

Figure 1A:
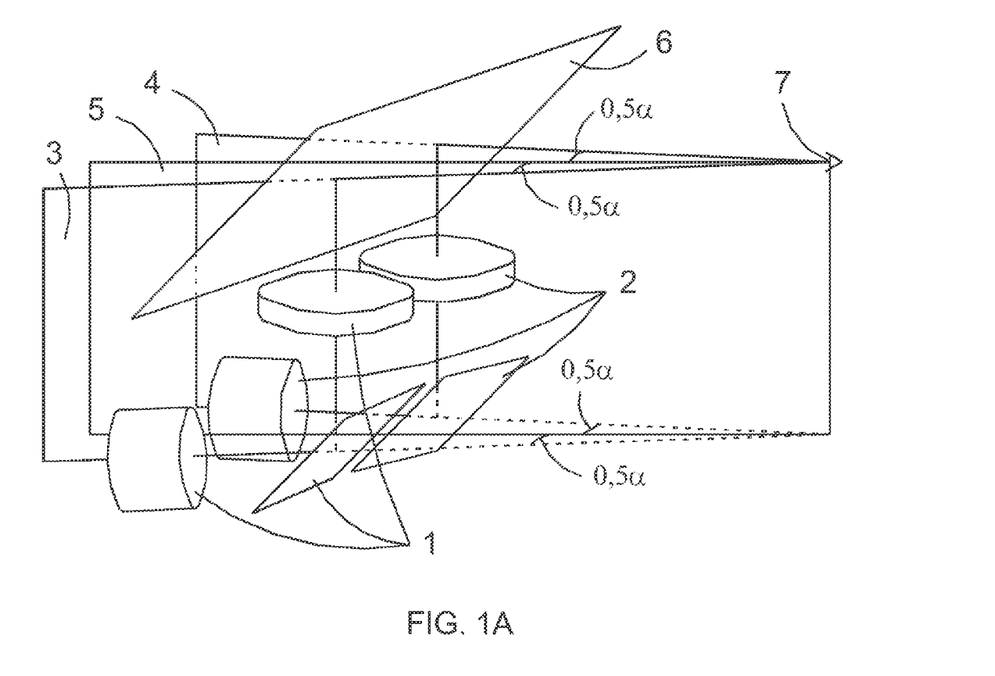
FIG. 1A shows architecture layout of collimating optical system with two unified optical systems.

FIG. 1A shows architecture layout of one of feasible variants of collimating optical system built according to suggested method. It contains two unified optical systems 1 and 2 spaced out horizontally with equal fields of view of rectangular shape the boundaries of that are oriented horizontally and vertically. Vertical symmetry plane 3 of the left unified optical system (1) and vertical symmetry plane 4 of the right unified optical system (2) are turned horizontally to the left and to the right, respectively, relative to vertical symmetry plane 5 of the collimating optical system under consideration at an angle $0.5\alpha$ that is equal to the half of horizontal size cc of angular field of view of single unified optical system. The scheme also shows semitransparent combiner 6 providing ability of uninterrupted viewing of collimated images formed by two unified optical systems of collimating optical system against the background of outer space subjects for the operator 7.

Figure 1B:
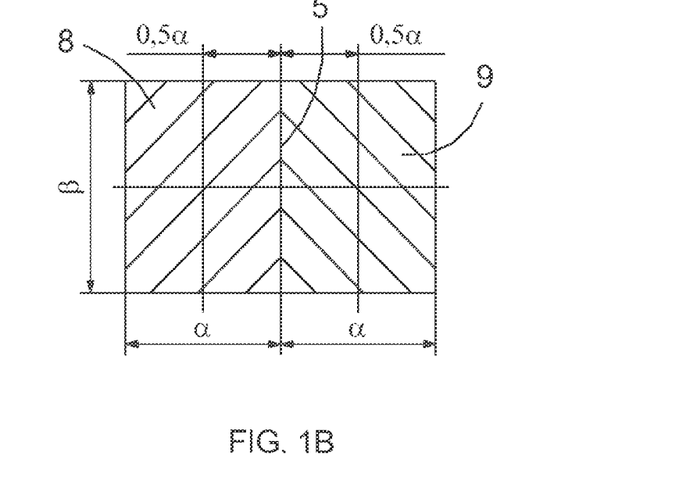
FIG. 1B shows total angular field of view of collimating optical system with two unified optical systems.

The total angular field of view of such collimating optical system is shown at FIG. 1B. It consists of angular field of view 8 formed by the left unified optical system 1 and angular field of view 9 formed by the right unified optical system 2 that have rectangular shape with sizes ($\alpha \times \beta$) horizontal and vertical respectively. At the same time the adjacent vertical boundaries of angular fields of view of two unified optical systems are superposed and coincided with vertical symmetry plane 5 of the collimating optical system (see FIG. 1A) and full angular field of view of such system is equal to the sum of angular fields of view of unified optical systems included in it and so its sizes is ($2\alpha \times \beta$) horizontally and vertically respectively.

Figure 2A:
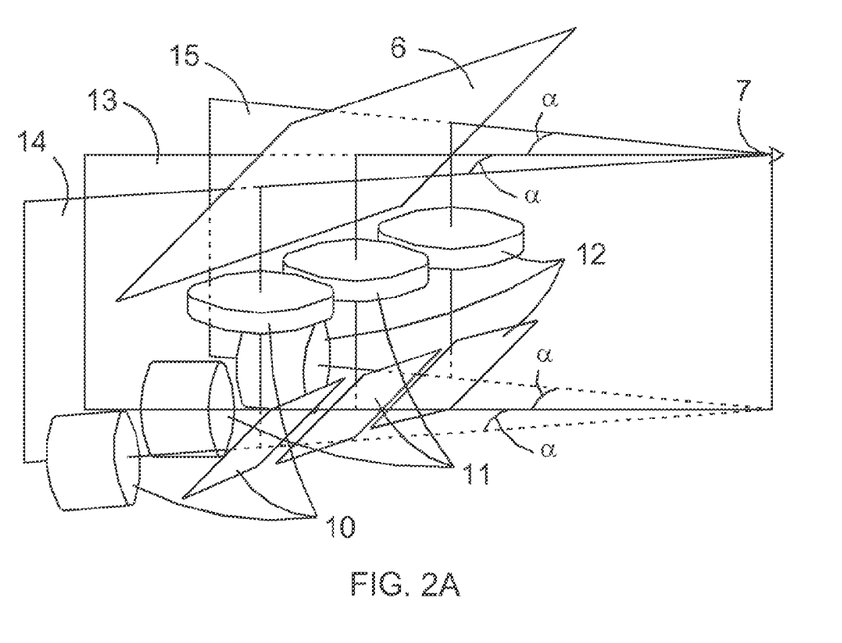
FIG. 2A shows architecture layout of collimating optical system with three unified optical systems.
Figure 2B:
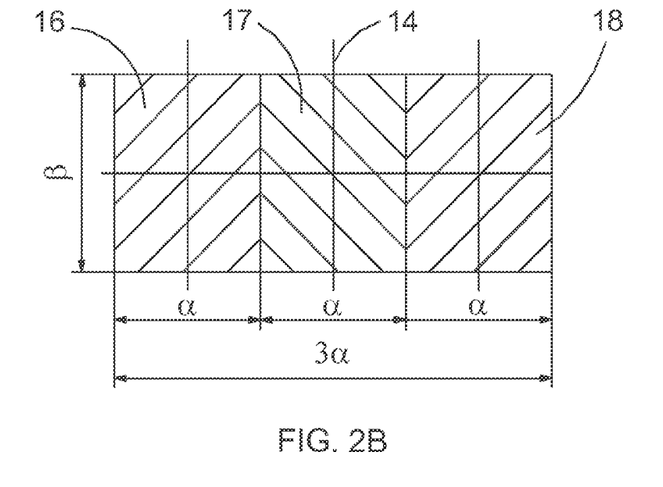
FIG. 2B shows total angular field of view of collimating optical system with three unified optical systems.

FIG. 2A shows architecture layout of another variant of collimating optical system built according to the suggested method. It contains three unified optical systems (10,11,12) spaced horizontally that have equal angular fields of view of rectangular shape boundaries of that are oriented horizontally and vertically. Vertical symmetry plane of the middle unified optical system 11 coincides with vertical symmetry plane 13 of wide-angle collimating optical system under consideration and the exit optic axis 14 of the left unified optical system 10 and the exit optic axis 15 of the right unified optical system 12 are turned horizontally to the left and to the right respectively relative to mentioned vertical symmetry plane 13 of the whole system at an angle $\alpha$ that is equal to the horizontal size $\alpha$ of angular field of view of single unified optical system. The scheme also shows the semitransparent combiner 6 providing the ability of uninterrupted viewing of collimated images formed by three unified optical systems of the collimating optical system against the background of outer space objects for the operator 7. The total angular field of view of such system is shown at FIG. 2B. It consists of angular fields of view 16,17,18 formed by left (10), middle (11) and right (12)

unified optical systems that have rectangular shape with sizes ($\alpha \times \beta$) horizontally and vertically respectively. At the same time adjacent vertical boundaries of angular fields of view of neighboring unified optical systems are superposed and the center of angular field of view of the middle unified optical system coincides with the vertical symmetry plane 13 of the collimating optical system. Full angular field of view of such system is equal to the sum of angular fields of view of unified optical systems included into the system and its sizes are ($3\alpha \times \beta$) horizontally and vertically respectively.

Figure 3A:
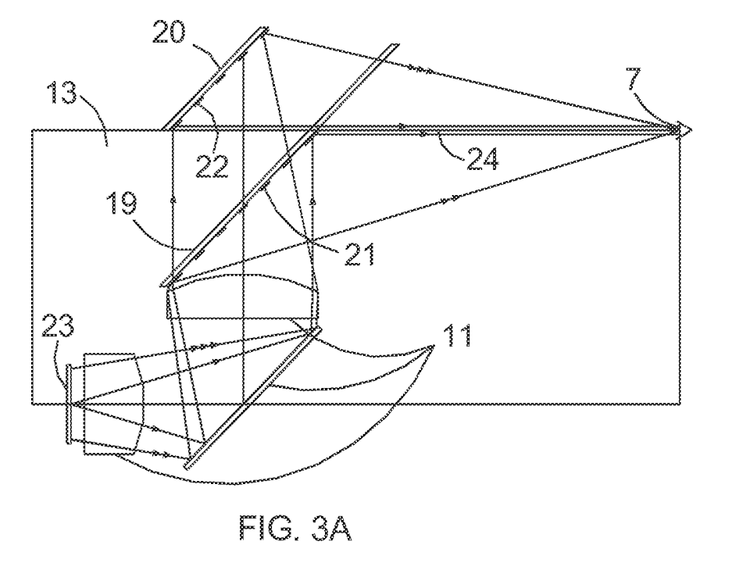
FIG. 3A shows profile section of collimating optical system with two-component combiner.

In order to provide uninterrupted perception of total collimated image formed by summation of the images formed by several unified optical systems of the collimating optical system against the outer space background it is suggested to apply joint optical combiner located perpendicularly to the vertical symmetry plane of collimating optical system. For example, the combiner could be carried out in the form of two-component element as it is shown at FIG. 3A. The section in vertical symmetry plane 13 of the collimating optical system (see FIG. 2A) is shown that indicates the middle unified optical system 11 and two-component combiner located perpendicularly to the plane of the figure.

Combiner includes two mutually parallel semitransparent reflectors (components) tilted to the horizontal plane at an angle 45 (approximately) and spaced out between each other in height by fixed distances.

Figure 3B:
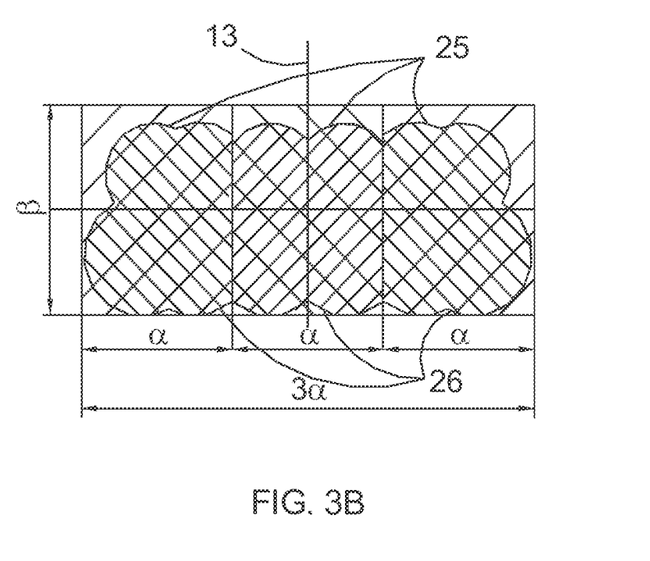
FIG. 3B shows diagrams of full and instantaneous fields of view of collimating optical system with three unified optical systems and two-component combiner.

The lower component 19 is located closer to the operator 7 than the upper component 20 and it covers full total angular field of view of the collimating optical system and has light-dividing coating 21 at its lower part overlapping only the lower part of the total angular field of view. The upper component 20 overlaps only the upper part of the total angular field of view and has light-dividing coating 22 on the whole surface. The screen 23 of the primary image creator (CRT or LCD screen) is shown symbolically in the focal plane of the unified optical system 11. The light rays (indicated by one arrow) emitted from the center of the screen 23 enter the operator's eyes 7 along the exit axis 24 of the system 11 due to reflection from the lower component 19 or the upper component 20. Light rays (indicated by two arrows) emitted from the lower edge of the screen 23 enter the operator's eyes 7 due to reflection from the lower part of the lower component 19. Light rays (indicated by three arrows) emitted from the upper edge of the screen 23 enter the operator's eyes 7 due to reflection from the upper part of the upper component 20. It is well known that two-component combiner provides increase of vertical size of the part of angular field of view of the collimating optical system accessible for operator's perception without head moving (instantaneous field of view) by use of dividing of collimated light beams output from the collimating system by the components of the combiner. From the point of view of the geometry it is equivalent to increasing of vertical sizes of exit elements of the collimating optical system. FIG. 3B shows possible shape of the total instantaneous field of view of wide-angle collimating optical system with three unified optical systems and two component combiner in which the lower parts 25 of the field are formed due to the lower component 19 and the upper parts 26 of the field are formed due to the upper component 20.

Figure 4:
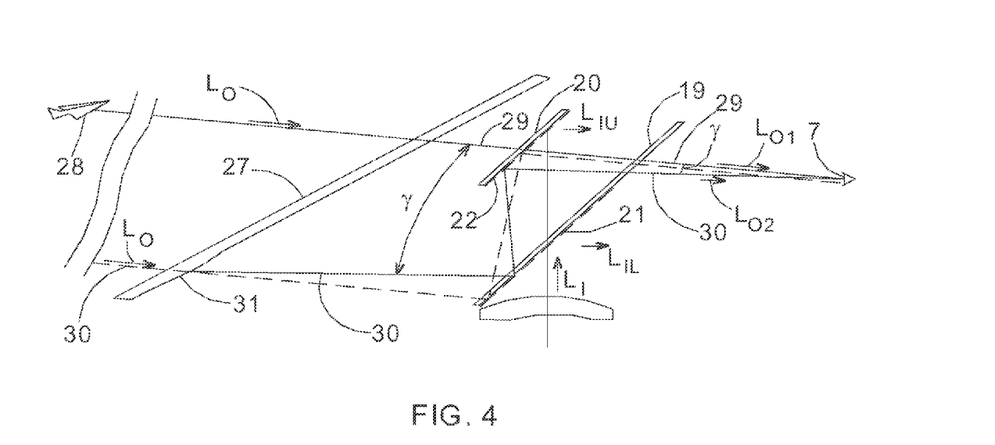
FIG. 4 shows acting of two-component combiner jointly with the windscreen.

It is necessary to note the feature of the two-component combiner when it is acting together with the windscreen (faceplate) of an object in that it is installed. FIG. 4 shows the combiner consisting of two components 19, 20 with light-dividing coatings 21,22, windscreen 27 and distant object 28. Operator 7 is viewing the object 28 along the ray 29 passing through the upper area of the windscreen 27 and upper component 20 and also he can see it along the ray 30 (that is practically parallel to the ray 29 because of significant remoteness of the outer object 28), passing through the lower area of the windscreen and reflected sequentially from the lower 19 and upper 20 components of the combiner. If the windscreen is a parallel-sided plate then the ray 30 remains parallel to the ray 29 after passing through it and after reflections from the components 19 and 20 it could coincide with the ray 29 (indicated by dotted line).

But most often the windscreen (faceplate, viewing port, etc.) 27 is not free from optical defects such as wedging 31, e.g., in the area of passage of the ray 30 that causes deviation of the ray 30 from its initial direction. In view of this effect some angle $\gamma$ will appear between the rays 29 and 30 after the windscreen 27 that will be saved after re-reflection of the ray 30 from the components 19 and 20. In this case when viewing through the upper component 20 operator 7 can see ghosting of the outward object 28 if brightness of the secondary image of the object (along the ray 30 after the two-component combiner) is sufficiently high. Let us indicate brightness of the object 28 along the rays 29 and 30 before the windscreen—Lo and after the two-component combiner: along the ray 29—$L_{O1}$ and along the ray 30—$L_{O2}$. Then it is possible to calculate brightness $L_{O1}$ of the primary image and brightness $L_{O2}$ of the secondary image of the object by following formulas:

$$L_{O1}=(1-\rho_U)L_O$$

$$L_{O2}=\rho_L\rho_U L_O$$

$\rho_L$ and $\rho_U$—reflection coefficients of lower (19) and upper (20) components of combiner respectively.

In this case ratio M between the brightness $L_{O1}$ and $L_{O2}$ of the object follows the formula:

$$M=L_{O2}/L_{O1}=\rho_L\rho_U/(1-\rho_U) \quad (1)$$

The ratio of reflection coefficients $\rho_L$, $\rho_U$ of components of the combiner has to be selected taking into account uniformity of brightness of collimated image represented for operator within full angular field of view, i.e., when viewing both through the lower and through the upper components. If the brightness of collimated image before the combiner is indicated Li then brightness of images after the combiner (for operator) follows the formulas:

$$L_{IL}=\rho_L L_I$$

$$L_{IU}=\rho_U(1-\rho_L)L_I$$

$L_{IL}$ and $L_{IU}$—brightness of collimated image viewed on the lower (19) and upper (20) components of the combiner respectively.

Taking into account that brightness of both collimated images after the combiner has to be equal (Lil=Liu) the ratio of the reflection coefficients $\rho_L$ and $\rho_U$ follows the formula:

$$M=(\rho_L)^2/(1-2\rho_L)$$

In order to avoid the influence of the secondary image of outward object on the operation of collimating optical system with two-component combiner it is enough for the brightness $L_{O2}$ of secondary image not to exceed threshold value 8-10% of brightness $L_{O1}$ of primary image of the outward object, i.e.:

$$M=(\rho_L)^2/(1-2\rho_L)\le 0.1$$

In view of (2) we can define the requirements for $\rho_L$ and $\rho_U$ compliance with that makes the bifurcation of the outward objects practically not perceptible:

$$\rho_L\le 0.23$$

$$\rho_U\le 0.30.$$

Figure 5:
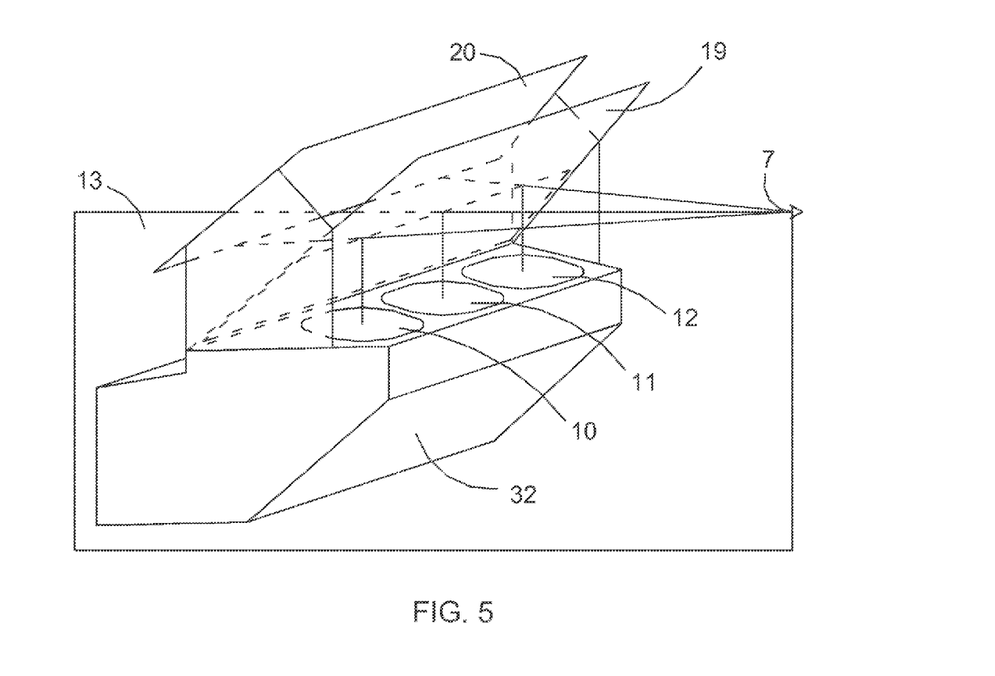
FIG. 5 shows layout of optical module for panoramic collimating optical system.

By the method suggested in order to build the panoramic optical system with super wide-angle horizontal angular field of view it is necessary to use several optical modules spaced out horizontally and each of them is collimating optical system in its turn including several unified optical systems and two-component combiner. One of feasible variants of optical module layout is shown at FIG. 5 and it is a collimating optical system 32 construction of which is shown at FIG. 5 and FIG. 3A including three unified optical systems (10,11, 12) and two-component combiner 19,20 that are fixed in single case. The module has vertical symmetry plane 13 and angular field of view size ($3\alpha \times \beta$) horizontally and vertically respectively as it is shown at FIG. 2B.

Figure 6A:
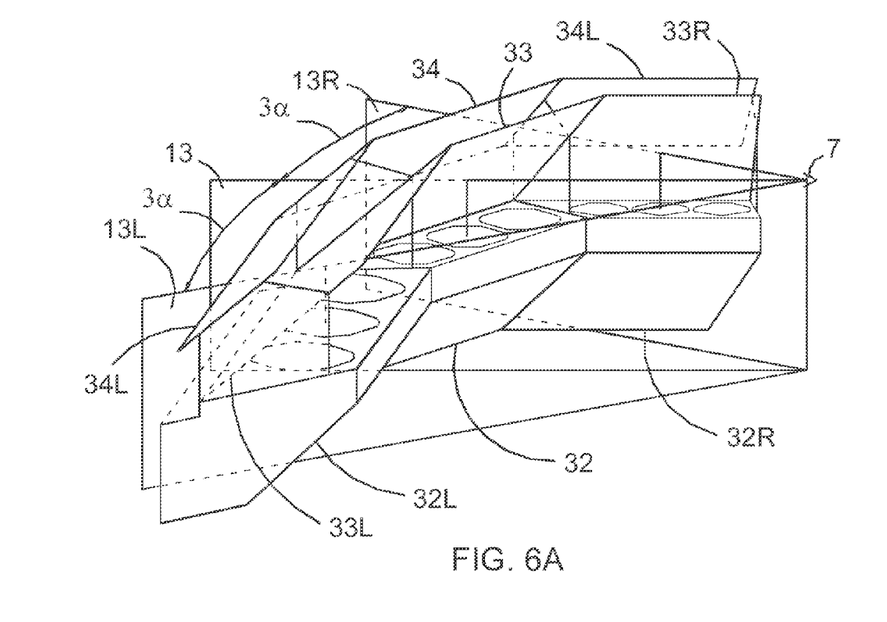
FIG. 6A shows layout scheme of panoramic collimating optical system containing three optical modules.
Figure 6B:
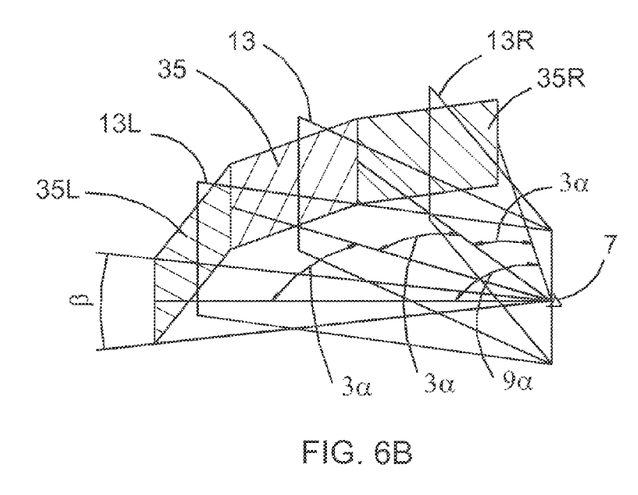
FIG. 6B shows total angular field of view of panoramic collimating optical system containing three optical modules.
Figure 7:
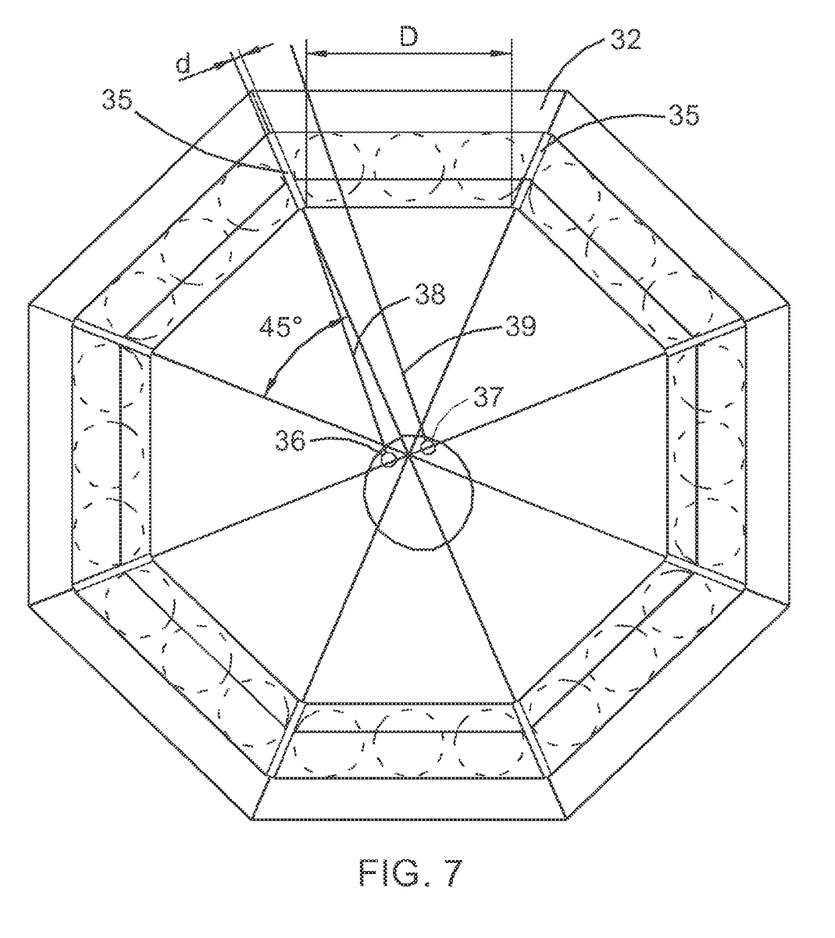
FIG. 7 shows scheme of panoramic collimating optical system of all-round viewing.

Scheme of panoramic optical system consisting of three identical optical modules corresponding to the module shown at FIG. 5 is shown at FIG. 6A. The middle module 32, the left module 32L and the right module 32R are spaced out horizontally and:

vertical symmetry planes of the left (13L) and the right (13R) modules are spaced out horizontally relative to the vertical symmetry plane of the middle module (13) at an angle $3\alpha$ horizontally to the left and to the right respectively.

adjacent vertical planes of the cases of the neighboring modules are superposed and attached to each other;

adjacent vertical edges of lower components 33L (of the left module), 33 (of the middle module) and 33R (of the right module) are superposed;

adjacent vertical edges of upper components 34L (of the left module), 34 (of the middle module) and 34R (of the right module) are superposed;

adjacent boundaries of angular fields of view 35L, 35, 35R of modules 32L, 32, 32R respectively are superposed as shown at FIG. 6B and full angular field of view of panoramic collimating optical system is equal to the sum of angular fields of view 35L, 35 and 35R respectively, i.e. its size is ($9\alpha \times \beta$) horizontally and vertically respectively In principle such panoramic collimating optical system is capable to include any number of modules with corresponding widening of total angular field of view of the system horizontally up to the full all-round viewing (up to 360). For example the system of all-round viewing is shown at FIG. 7A (view from above) including 8 optical modules 32 (in accordance with FIG. 5) and each of them has angular field of view size 45×20 horizontal and vertical respectively. Consequently the horizontal size of total angular field of view of such system is equal 45×8=360.

Modern technologies of processing and formation of large information content of computer graphics and video allow to operate in real-time with several primary image creators, e.g. LCD, included in panoramic collimating optical system in such way that collimated color image formed by the system is perceived by the operator within full angular field of view in the form of uninterrupted informational picture.

When using such systems the outer space has to be perceived by operator through the two-component combiner without interruptions. Thus uninterrupted viewing of outer space is provided within full angular field of view of panoramic collimating optical system in all cases. For that the adjacent edges of components of the combiners of neighboring optical modules have to be fixed in joint fixing units 35 in such way that any fixing unit could not obstruct (shade) the outer space for both eyes of operator simultaneously. To meet these requirements following conditions have to be fulfilled:

width d of non-transparent parts of joint fixing units of components of the combiner has not to exceed the human eye-base (2 inch);

width D of semitransparent part of any component of the combiner has to be not less than maximum human eye-base (3 inch);

In the case shown on FIG. 7 when certain area of the outer space is shaded by the fixing unit 35 e.g., for the left eye 36 of operator along the ray 38 the right eye 37 sees said area along the ray 39 parallel to the ray 38 passing through the upper (lower) component of the combiner, i.e., the monocular viewing of said area is used. For the rest cases the operator sees the outer space using binocular vision (both eyes), i.e., both eyes of the operator look either through the upper (lower) component of the combiner of one optical module or through upper (lower) components of the combiners of neighboring optical modules.

Panoramic collimating optical systems can be successfully applied in various types of training apparatus, simulators of outward viewing, etc. If panoramic systems are used under steady-state conditions then if required it is also possible to increase vertical size $\beta$ of angular field of view of unified optical systems included into optical modules at the expense of complication of them. In this case the increased exit optical elements can be carried out with cut side segments in order to reduce weight of the system.

Foregoing new method of construction of collimating optical systems allows to solve the problem efficiently, namely, based on application of relatively simple and inexpensive in manufacturing ax symmetric optical elements it makes it possible to provide widening of angular field of view of collimating optical systems horizontally up to the values significantly exceeding those values that have been achieved in known systems intended for similar purposes both ax symmetric and off-axis in which costly and technologically sophisticated HOEs are used. The method is based on the construction of complex wide-angle collimating optical system (optical module) consisting of several more simple ax symmetric unified optical systems that are arranged taking into account meeting of specified requirements. To prove the efficiency of suggested method let us give several numerical examples. There are known ax symmetric collimating optical systems for modern aircrafts with maximum accessible parameters—diameter of angular field of view 25° and diameter of exit lenses 150 mm. LCD are mainly used in modern collimating displays with rectangular screen and so the rectangular angular field of view 15°×20° can be inscribed into circular angular field of view Ø25° without information losses. There are also known off-axis collimating optical systems based on HOE the angular field of view of that have been widened up to Ø30° and upper and lower segments of that have been cut up to the vertical size 25°. The rectangular field of view of about 20°×27° can be inscribed into it without information losses.

Further increasing of angular field of view for both ax symmetric collimating optical systems and systems with HOE is so complicated, labor-intensive and ineffective that significant progress is unlikely for this trend.

As opposed to this the suggested method allows to provide significant increasing of angular field of view of collimating optical systems due to their construction using comparably simple ax symmetric unified optical systems included in it. For example if collimating optical system contains two unified optical systems and angular field of view of each of them is 15°×20° then total angular field of view of the system is 20°×30° that is two times more than for ax symmetric system and 10% more than for off-axis system. When using three unified optical systems in wide-angle collimating optical system the total angular field of view is 20°×45° that is three times more than for ax symmetric system and 67% more than for off-axis system, etc. It is necessary to note that increasing of the total angular field of view of wide-angle collimating optical system does not cause:

deterioration of collimated image in peripheral areas of the total angular field of view since it consists of single angular fields of view of unified optical systems that are equivalent in image quality;

reduce of resolution and comprehension of content since when widening total angular field of view by increasing of number of unified optical systems included into the system the number of primary image creators is increased also due to that specific resolution (e.g., number of pixels per one degree of angular field of view) is saved practically invariable;

restrictions when working within full visible spectral range since the system does not include diffracting, holographic or other selective elements.

Finally, suggested method allows to construct collimating optical systems consisting of several optical modules with angular fields of view 20°×30°, 20°×45°, etc., the total angular field of view of that can be increased up to all-round viewing, i.e. up to 20°×360°.

Generally, when using the suggested method of widening of angular field of view of the collimating optical system horizontally irrespective of the number of unified optical systems included into the collimating optical system one of the main requirements is turning of vertical symmetry planes of unified optical systems horizontally at a certain angles in such way that adjacent vertical boundaries of angular fields of view of neighboring systems are superposed. If N—unified optical systems are used in the collimating optical system with identical fields of view of rectangular shape the sizes of that are (x)-horizontal and vertical respectively then vertical symmetry plane of unified optical system with order number i has to be turned horizontally relative to vertical symmetry plane of the collimating optical system at an angle θi that is defined in the following way:

a) if the number of unified optical systems is even (N=2 k) then the systems located to the left of vertical symmetry plane of the collimating optical system are indicated by order numbers i=−1, −2, . . . , −k and systems located to the right are indicated by order numbers i=1, 2, . . . , k and angles θi follows the formulas:

$$\theta i=(i+0,5)\alpha, \text{ if } i=-1,-2,\ldots,-k \quad (1)$$

$$\theta i=(i-0,5)\alpha, \text{ if } i=1,2,\ldots,k \quad (2)$$

α—horizontal size of angular field of view of unified optical system

For the systems located to the right of the vertical symmetry plane of the collimating optical system θi is positive and it is negative for the systems located to the left of it.

b) If the number of unified optical systems is odd (N=1+2 k) then vertical symmetry plane of the middle system indicated by the order number i=0 coincides with vertical symmetry plane of the collimating optical system and has θo÷0 and for the rest of the systems the order numbers i and angles of turn θi are defined in accordance with subparagraph a).

For panoramic collimating optical system containing N identical optical modules with identical angular fields of view of rectangular shape the boundaries of that are oriented horizontally and vertically the order numbers i of optical modules and angles of turn θi of vertical symmetry planes of optical modules are also defined in accordance with subparagraphs a),b) provided that parameter <<α>> indicates the horizontal size of angular field of view of optical module.

So it is possible to make a conclusion that:

with an even number of unified optical systems (optical modules) which have identical angular fields of view their vertical symmetry planes have to be turned to the left (right) relative to the vertical symmetry plane of the collimating optical system at an angles that are equal to the product of the order number indicating their location relative to the vertical symmetry plane of the collimating optical system to the horizontal size of angular field of view of unified optical system (optical module) minus half of the horizontal size of angular field of view of unified optical system (optical module);

with an odd number of unified optical systems (optical modules) which have identical fields of view the vertical symmetry plane of the middle unified optical system (optical module) coincides with vertical symmetry plane of the collimating optical system and vertical symmetry planes of the rest unified optical systems (optical modules) have to be turned relative to the vertical symmetry plane of the collimating optical system to the left (right) at an angles equal to the product of their order number indicating their location relative to the middle unified optical system (optical module) to the horizontal size of angular field of view of unified optical system (optical module).

Above mentioned newly derived correlations are of great practical importance when realizing the suggested method. When constructing collimating optical system with specified optical characteristics they allows to calculate in advance the parameters of the design elements intended for fixing of optical elements of unified optical systems (optical modules) owing to that the boundaries of adjacent optical systems are superposed.

Advantages of the Invention

The method is suggested whereby horizontal widening of angular field of view of collimating optical system is achieved by application of several unified optical systems spaced out horizontally with angular fields of view of rectangular shape the boundaries of that are oriented horizontally and vertically. At the same time vertical symmetry planes of neighboring unified optical systems are turned horizontally in such way that adjacent vertical boundaries of angular fields of view of neighboring unified optical system are superposed and full angular field of view of the collimating optical system is equal to the sum of angular fields of view of unified optical systems included in it.

The suggested method allows to build wide-angle collimating optical systems based on ax symmetric optics and intended for application for equipment of various types including collimating displays for aircrafts with horizontal size of field of view exceeding the similar parameter attained for collimating optical systems based on holographic optical elements (HOE). It is necessary to note that specific conditions are required for manufacturing of HOEs that are labor-intensive and expensive. Moreover optical systems based on HOE allows to form only monochromatic image in its field of view and so its informational capabilities are reduced. As opposed to the systems with HOE wide-angle collimating optical systems constructed according to suggested method are capable to operate within full visible spectral range and owing to this they provide representation of color image within their angular field of view.

According to suggested method of widening of angular field of view two-component combiner is used to sum up horizontal angular fields of view of unified optical systems that simultaneously allows to increase instantaneous vertical field of view of the system.

Suggested method allows to eliminate practically all effects caused by optical defects of the windscreen installed in front of the combiner by use of choosing of reflection coefficients of the components. Such effects are caused by faintly visible ghosting of the image of outward object viewed by operator through the upper component of the combiner that occurs under certain outward conditions.

Suggested method of widening of angular fields of view of collimating optical systems allows to use efficiently the increased information space and improve quality (brightness and resolution) of the image formed within angular field of view of the system by installing primary image creator, e.g. LCD, into each unified optical system and locating it in its focal plane.

Suggested method provides for application of lens components and flat mirrors in collimating optical systems owing to that it is possible to use mastered technology of optical elements manufacturing using both accepted (silicate) optical glass (machining) and plexiglas, e.g. acrylic (casting, forming, etc.) that makes it possible to decrease significantly the weight of the system and cheapen production.

Suggested method of widening of angular field of view of collimating optical systems is based on novel conceptual approach that is not mentioned in publication database. This method makes it possible to develop collimating optical systems intended for equipment of various types and among them for collimating displays that are intended to be installed in various aircrafts. Collimating optical systems constructed according to the method have the following advantages:

by use of set of unified ax symmetric collimating optical systems and summarizing their angular fields of view the collimating optical system with any required horizontal size of angular field of view (up to 360) is possible to be build;

increase of total angular field of view of wide-angle collimating optical system does not cause deterioration of collimated image in peripheral areas of total angular field of view since it consists of equivalent single angular fields of view of unified optical systems included in it;

increase of total angular field of view of wide-angle collimating optical system does not cause the lowering of the resolution and reduction of information content since when widening total angular field of view by increasing the number of unified optical systems included in it the number of primary image creators is increased accordingly and owing to that specific quantity of resolution is saved almost unchanged;

basic optical components of collimating optical systems have no restrictions for operating within full visual spectral range owing to that it is possible to apply the systems in equipment intended to represent color information pictures.

Thus the suggested method of widening of angular field of view of collimating optical systems allows not only to solve the urgent problem of widening of angular field of view but also makes it possible to provide conditions to create apparatus provided with novel capabilities to display large color information contents in optical infinity.

What is claimed:

1. A method of widening of angular field of view of collimating optical system used in head-up displays-HUD intended to control a flying vehicles and other moving objects whereas:
    the system is carried out with several unified ax symmetric collimating optical systems having identical angular fields of view of rectangular shape, symmetry planes of the unified optical systems are set vertically and turned horizontally so that adjacent vertical boundaries of angular fields of view of neighboring systems are superposed;
    the collimating optical is made with a single optical combiner.

2. The method of claim 1 wherein the two-component combiner is made in a form of two mutually parallel semi-transparent reflectors located perpendicularly to the vertical symmetry plane of the collimating optical system.

3. The two-component combiner of claim 2 wherein the semitransparent reflectors of the combiner tilted at an angle 40° . . . 50° to horizontal plane are spaced out by height at a fixed distance, a lower reflector is located closer to an operator than an upper one, the upper reflector is made 1.8 . . . 2.2 times shorter than the lower one and has light-dividing coating on the whole surface area, the lower reflector has light-dividing coating only on its lower part the area of which is equal to the difference of full areas of the lower and the upper reflectors.

4. The Method of claim 1 wherein the collimating optical system is made of several equal optical modules, each module is assembled of several unified optical systems and a single two-component combiner fixed in a single case, reflectors of the combiner are located perpendicularly to the vertical symmetry plane of the optical module.

5. The method of claim 4 wherein the adjacent vertical edges of the combiner components of neighboring optical modules are superposed in joint fixing units, the width of non-transparent parts of said joint fixing units is no more than 50 mm (2"), the width of the semitransparent part of any component of the combiner is not less than 80 mm (3¼").

6. The method of claim 4 wherein the collimating optical system is made of a set of optical modules, the horizontal size of total angular field of view of said modules is 360°.

* * * * *